E. EVANS.
TREE BARKING TOOL.
APPLICATION FILED OCT. 8, 1919.
1,352,057.
Patented Sept. 7, 1920.
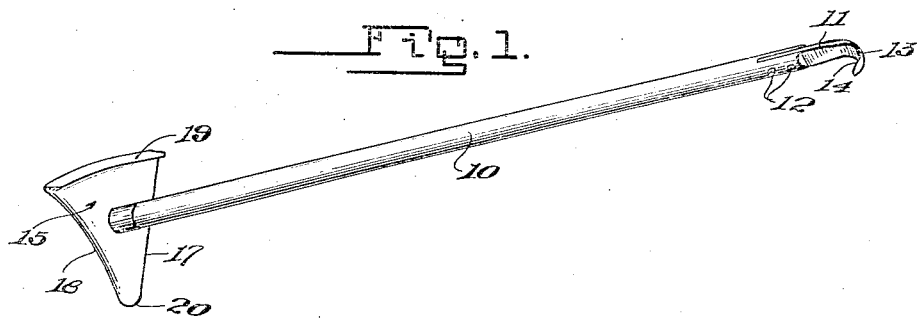
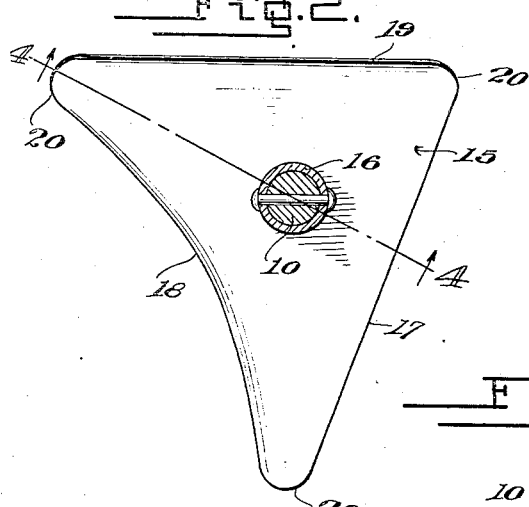
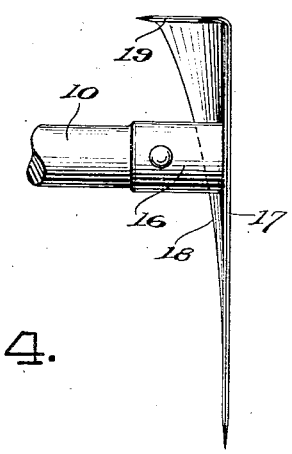
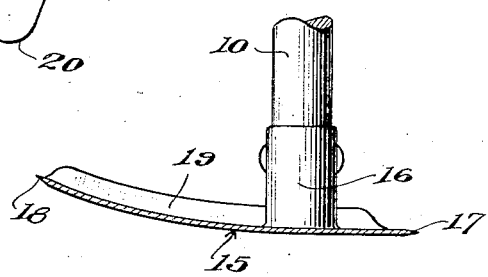
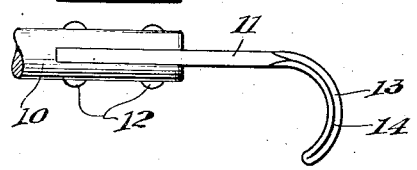
Ethel Evans
Inventor

UNITED STATES PATENT OFFICE.

ETHEL EVANS, OF WENATCHEE, WASHINGTON.

TREE-BARKING TOOL.

1,352,057. Specification of Letters Patent. Patented Sept. 7, 1920.

Application filed October 8, 1919. Serial No. 329,303.

*To all whom it may concern:*

Be it known that I, ETHEL EVANS, a citizen of the United States, residing at Wenatchee, in the county of Chelan and State of Washington, have invented certain new and useful Improvements in Tree-Barking Tools, of which the following is a specification.

This invention relates to a tool or instrument particularly designed for removing old and dead bark from trees and particularly fruit trees.

The trunks and crotches of trees accumulate, with age, a covering of gurled dead bark, which impede the circulation of the trees and provide breeding places for injurious insects, such as codling moths and other insects, which when grown destroy the fruit of the trees. In extensive orchards this dead and gurled bark is removed and consequently the nesting places for the insects are destroyed, and the removal of the bark further enables the spray which is used on the trees to kill these insects or pests, to reach all parts of the tree, the removal of the bark adds also to the appearance of the tree. Heretofore, in care of commercial orchards it has become the practice to scrape or remove this accumulation of dead bark, each spring, by means of case knives or pieces of sheet metal, made in various shapes. However, with tools of this type, it is a tedious, time absorbing and consequently expensive operation to remove the bark, and an object of this invention is to provide a composite tool, which will greatly facilitate this removal of the dead and gurled bark from the surfaces of the trunks of the trees, the crotches thereof and also from the limbs, where it is necessary, which tool comprises a substantially triangularly shaped plate of tool steel or analogous material, having an arcuate or concaved edge, sharpened, and adapted to fit the convex portion of the tree, for facilitating the removal of dead bark therefrom, which plate further has a straight flat sharpened edge for removing the dead or gurled bark from large tree trunks or flat portions upon a tree trunk, as well as being provided with a sharpened edge portion bent at right angles to the main body of the plate and extending substantially parallel with the handle of the tool to permit the levering action in removing extra heavy or thick accumulations of the undesirable bark, and further to curve the plate from the handle in one direction so as to present a slightly concavo-convex plate shaped to permit maximum ease of operation thereof.

A further object of the invention is to provide a second plate upon the end of the handle opposite to that which carries the triangularly shaped plate, this second plate being substantially in the form of a hook having sharpened edges and being designed for removing the accumulated dead bark from relatively narrow or sharp angled crotches in the tree structure.

Other objects of the invention will appear in the following detailed description taken in connection with the accompanying drawing, forming a part of this specification, and in which drawing:

Figure 1 is a perspective view of the improved tool.

Fig. 2 is a section through the handle, and illustrating the substantially triangularly shaped plate in plan.

Fig. 3 is a side elevation of a substantially triangularly shaped plate.

Fig. 4 is a section taken on the line 4—4 of Fig. 2, and

Fig. 5 is a detail edge elevation of the hook shaped plate of the tool structure.

Referring more particularly to the drawings, wherein like characters indicate like and corresponding parts throughout the several views, the handle 10 of the tool may be constructed of wood or any suitable material, preferably in the manner of constructing hoe or rake handles, and one end of this handle is bifurcated and the bifurcation receives therein the attaching portion of the plate 11. Rivets or analogous fastening devices 12 are inserted diametrically through the bifurcated end of the handle 10 and through the main body of the plate 11 for permanently attaching this plate to one end of the handle 10. The outer end portion 13 of the blade 11 is curved, to form a substantially hook shaped blade, each edge of which is sharpened as indicated at 14. If desirable, the edges of the blade 11 may converge toward the terminal of the hook or bill portions thereof to provide a substantially pointed arcuate blade sharpened upon each edge, which may be used for marking out or cutting out the dead bark from in the relatively small portion of the crotch of a tree.

The handle 10 has a substantially triangularly shaped blade 15 attached to the end thereof opposite to the end which carries the blade 11 by means of a ferrulate 16, of the type commonly employed in attaching hoes, rakes or analogous tools to their handles. The blade 15 has a straight edge 17, which is sharpened and is designed to facilitate the cutting or removal of the dead or gurled bark from flat portions of a tree trunk or from a relatively large tree trunk, the tool being used much in the manner of a hoe, adz or analogous tool, and the entire blade curves, from the handle 10 and away from the edge 17, the portion of the blade adjacent its edge being perfectly flat. The portion of the blade which curves presents a concaved surface toward the end of the handle which carries the blade 11, and a convex surface outwardly, so as to position the cutting edge 18 in such position with respect to the handle 10 as to permit ease of operation of the tool and at the same time permit maximum efficiency during the operation. The edge 18 is concaved, and sharpened, as clearly shown in Figs. 3 and 4 of the drawings for fitting about portions of the trunk of the tree, and also about limbs thereof. The curved edge 19 of the plate 15, is bent at substantially right angles to the flat portion of the blade adjacent the edge 17 and to extend substantially parallel to the handle 10. This angled edge 19 is arcuated longitudinally, if desired, and it is provided to permit a sharp leverage action, for use in removing relatively thick or heavy accumulation of bark from a tree, or for any other use to which it might be conveniently put during the use of the tool. by particular reference to Figs. 1 and 2 of the drawings it will be noted that all of the corners of the plate 16 are rounded as shown at 20, this rounding of the corners being provided to prevent the accidental cutting of the good or live bark of the trees, which would be occasioned by the provision of sharp points at the corners of the tool.

Changes in details, may be made without departing from the spirit of this invention, but;

I claim:

1. In a tool as specified, the combination of a handle, a blade carried at one end of said handle and provided with a flat portion upon one side of the handle terminating in a straight sharpened edge, a portion of said blade extending upon the opposite side of the handle from said flat portion being curved and presenting outwardly a convexed surface.

2. In a tool as specified, the combination of a handle, a blade carried at one end of said handle and provided with a flat portion upon one side of the handle terminating in a straight sharpened edge, a portion of said blade extending upon the opposite side of the handle from said flat portion being curved and presenting outwardly a convexed surface, said curved portion terminating in a concaved sharpened edge.

3. In a tool as specified, the combination of a handle, a blade carried at one end of said handle and provided with a flat portion upon one side of the handle terminating in a straight sharpened edge, a portion of said blade extending upon the opposite side of the handle from the said flat portion being curved and presenting outwardly a convexed surface, said curved portion terminating in a concaved sharpened edge, the edge of said plate connecting said straight and concaved edge being angled, and sharpened to provide a sharpened edge positioned at substantially right angles to the flat sharpened edge.

4. In a tool as specified, the combination, of a handle, a substantially triangularly shaped blade carried at one end of said handle, the portion of said blade extending toward one edge thereof from the handle being flat, and terminating in a straight sharpened edge, the portion of the blade extending from said handle in a direction opposite said straight portion being curved to present outwardly a convexed face, another edge of said plate being bent at substantially right angles to said flat portion and having its edge sharpened.

5. In a tool as specified, the combination, of a handle, a substantially triangularly shaped blade carried at one end of said handle, the portion of said blade extending toward one edge thereof from the handle being flat, and terminating in a straight sharpened edge, the portion of the blade extending from said handle in a direction opposite said straight portion being curved to present outwardly a convexed face, another edge of said plate being bent at substantially right angles to said flat portion and having its edge sharpened, the remaining edge of said substantially triangularly shaped plate being concaved and sharpened.

6. In a tool as specified, the combination, of a handle, a substantially triangularly shaped blade carried at one end of said handle, the portion of said blade extending toward one edge thereof from the handle being flat, and terminating in a straight sharpened edge, the portion of the blade extending from said handle in a direction opposite said straight portion being curved to present outwardly a convexed face, another edge of said plate being bent at substantially right angles to said flat portion and having its edge sharpened, the remaining edge of said substantially triangularly shaped plate being concaved and sharpened, the corners of said plate being rounded.

ETHEL EVANS.